United States Patent [19]

Polaski et al.

[11] Patent Number: 5,432,221

[45] Date of Patent: Jul. 11, 1995

[54] HYDROXY-FUNCTIONAL ACRYLIC POLYMER COMPOSITIONS HAVING COMPATIBILITY WITH CASTOR OIL

[75] Inventors: John R. Polaski; Julie E. Slawikowski, both of Tinley Park, Ill.

[73] Assignee: The Sherwin-Williams Company, Cleveland, Ohio

[21] Appl. No.: 78,376

[22] Filed: Jun. 17, 1993

[51] Int. Cl.⁶ .................. C08L 35/02; C08K 5/11
[52] U.S. Cl. .................. 524/310; 524/507; 524/523; 525/374; 525/419; 525/453; 526/319; 526/320
[58] Field of Search .............. 524/310; 525/453, 452

[56] References Cited

U.S. PATENT DOCUMENTS

| | | | |
|---|---|---|---|
| 3,873,584 | 3/1975 | Burke, Jr. et al. | 260/407 |
| 3,948,960 | 4/1976 | Burke, Jr. et al. | 260/407 |
| 3,956,250 | 5/1976 | Campbell et al. | 526/194 |
| 4,005,041 | 1/1977 | Piggott | 260/18 TN |
| 4,020,216 | 4/1977 | Miller | 428/425 |
| 4,049,596 | 9/1977 | Traister et al. | 260/18 EP |
| 4,063,011 | 12/1977 | Campbell et al. | 526/194 |
| 4,086,853 | 5/1978 | Figov | 101/463 |
| 4,598,015 | 7/1986 | Panush | 428/324 |
| 4,610,744 | 9/1986 | Smith | 156/235 |
| 4,971,841 | 11/1990 | Panush | 427/407.1 |
| 5,139,817 | 8/1992 | Abe | 427/54.1 |

*Primary Examiner*—Fred Zitomer
*Attorney, Agent, or Firm*—Heidi A. Boehefeld; Robert E. McDonald; Steven W. Tan

[57] ABSTRACT

A hydroxy-functional acrylic polymer useful in multi-component curable compositions wherein the curable composition contains castor oil and at least one polyisocyanate in addition to the hydroxy-functional acrylic polymer. The hydroxy-functional acrylic polymer comprises vinyl toluene, a monomer selected from lauryl methacrylate and stearyl methacrylate, and a hydroxy-functional monomer selected from hydroxypropyl methacrylate and hydroxypropyl acrylate, and is compatible with castor oil.

22 Claims, No Drawings

HYDROXY-FUNCTIONAL ACRYLIC POLYMER COMPOSITIONS HAVING COMPATIBILITY WITH CASTOR OIL

BACKGROUND OF THE INVENTION

This invention relates to hydroxy-functional acrylic polymers, and in particular, to a hydroxy-functional acrylic polymer that is compatible with castor oil.

The hydroxy-functional acrylic polymer of this invention is especially useful in multi-component curable compositions comprising (1) a hydroxy-functional acrylic polymer, (2) at least one polyisocyanate, and (3) castor oil.

SUMMARY OF THE INVENTION

The hydroxy-functional acrylic polymer of the present invention is formed from the copolymerization of monomers including vinyl toluene, a monomer selected from lauryl methacrylate and stearyl methacrylate, and a hydroxy-functional monomer selected from hydroxypropyl methacrylate and hydroxypropyl acrylate, and is compatible with castor oil. Preferably, the hydroxy-functional acrylic polymer of the present invention is formed from the copolymerization of monomers including 30–50% by weight vinyl toluene, 5–10% by weight lauryl methacrylate, and 30–50% by weight of a hydroxy-functional monomer selected from hydroxypropyl methacrylate and hydroxypropyl acrylate.

The present invention further relates to a curable composition comprising (a) an acrylic polymer formed from the copolymerization of monomers comprising vinyl toluene, a monomer selected from lauryl methacrylate and stearyl methacrylate, and a hydroxy-functional monomer selected from hydroxypropyl methacrylate and hydroxypropyl acrylate, wherein the acrylic polymer is compatible with castor oil; (b) castor oil; and (c) at least one polyisocyanate.

DETAILED DESCRIPTION OF THE INVENTION

The acrylic polymer of the present invention is prepared by the addition polymerization of at least three monomers. At least one of the monomers is a hydroxy-functional monomer, such as hydroxypropyl acrylate or hydroxypropyl methacrylate. The hydroxy-functional monomer is copolymerized with at least one ethylenically unsaturated monomer such as vinyl toluene. The acrylic polymer of the present invention also contains lauryl methacrylate or stearyl methacrylate. Preferably, the monomer mixture of the acrylic polymer of the present invention comprises 30–50% by weight of a hydroxy-functional monomer selected from hydroxypropyl methacrylate and hydroxypropyl acrylate, 30–50% by weight vinyl toluene, and 5–10% by weight lauryl methacrylate.

The acrylic polymer of the present invention may be used in a two-component, solvent containing urethane coating. Each component is held apart from the other and, shortly before use, the two components are mixed together. The first component generally consists of polyols, solvents, diluents, fillers, pigments, catalysts, flow agents, light stabilizers and other ingredients used in formulating urethane coatings. The second component generally consists of a polyisocyanate and is considered the hardener, or curing resin. Preferably, the polyisocyanate is present at a level to provide between about 0.6 to about 1.4 equivalents of isocyanate for each equivalent of active hydrogen from the hydroxyl groups of the acrylic polymer.

The solvents used in preparing urethane coatings which incorporate the acrylic polymer of the present invention include esters, ketones, ether-esters, and chlorinated hydrocarbons. Preferably, the solvent contains methyl n-amyl ketone.

An initiator may be used for the preparation of the acrylic polymer. Such initiators include azobis-(isobutyronitrile), cumene hydroperoxide, t-amyl peroxyethylhexanoate and t-butyl peroxide.

Chain transfer agents, most commonly mercaptans, may also be included in the first component of the two-component urethane coating to control the molecular weight of the polymer. Examples of such chain transfer agents include 2-mercaptoethanol, dodecyl mercaptan and lauryl mercaptan. Preferably, 2-mercaptoethanol is used as the chain transfer agent.

Preparation of the hydroxy-functional acrylic of the present invention will be described by way of example.

|  | weight (lbs) | weight (%) |
|---|---|---|
| methyl n-amyl ketone | 1092 | 49.1 |
| vinyl toluene | 523 | 23.1 |
| lauryl methacrylate | 55 | 2.5 |
| hydroxypropyl methacrylate | 524 | 23.6 |
| t-amyl peroxyethylhexanoate | 33 | 1.5 |
| 2-mercapto ethanol | 2.2 | 0.1 |
| t-butyl perbenzoate | 5.4 | 0.2 |

The hydroxy-functional polymer was prepared by charging a reaction vessel with 1092 parts methyl n-amyl ketone which was heated to 270° F. A monomer mixture comprising 535 parts vinyl toluene, 55 parts lauryl methacrylate, 524 parts hydroxypropyl methacrylate, 33 parts t-amyl peroxyethylhexanoate and 2.2 parts 2-mercaptoethanol was added to the reaction vessel over approximately a 4 hour period while maintaining the temperature at approximately 270° F. Upon completion of the 4 hour monomer addition, the temperature was held at approximately 270° F. for about 15 minutes. 2.7 parts of t-butyl perbenzoate was then added and the reaction mixture was held at 270° F. for about 1 hour, followed by a second addition of 2.7 parts of t-butyl perbenzoate after which the reaction mixture was held for an additional hour at 270° F.

Before introducing the acrylic polymer to the second component, the acrylic polymer is blended with castor oil. The castor oil may be dehydrated, blown or raw castor oil. The castor oil imparts flexibility and wetability to the urethane coating. The ratio of acrylic polymer to castor oil in the urethane coating depends on the desired properties of the resulting urethane coating. The acrylic polymer of the present invention is miscible, and thus compatible, with the castor oil. Evidence of incompatibility includes gelation, separation or clouding of the acrylic polymer/castor oil blend. The percentage by weight of castor oil relative to the total weight of acrylic polymer and castor oil in the urethane coating composition is within the range of 1–99%. The compatibility of the acrylic polymer of Example 1 with various oils was tested. When the acrylic polymer of Example 1 was mixed with an equal volume of oil, the following results were obtained:

TABLE 1

| Oil | Compatibility |
| --- | --- |
| Linseed | no |
| Tung | no |
| Soya | no |
| Dehydrated castor | yes |
| Blown castor | yes |
| Raw castor | yes |

In the preparation of the urethane coatings of the present invention, the acrylic polymer/castor oil blend of the first component is reacted with the polyisocyanate of the second component. Representative polyisocyanates include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4-diphenyl, 1,5-naphthalene and 1,4-naphthanene diisocyanates; the aliphaticaromatic compounds such as 4,4-diphenylene methane, 2,4- or 2,6-toluene, or mixtures thereof, 4,4'-toluidine, and 1,4-xylylene diisocyanates; the nuclear substitutes aromatic compounds such as dianisdine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. For urethane coatings having good weatherability, aliphatic polyisocyanates are preferred.

EXAMPLE 2

A two-component urethane coating was prepared according to the following recipe:

| | Pounds |
| --- | --- |
| COMPONENT 1 | |
| Hydroxy-functional polymer of Example 1 | 194.04 |
| Blown castor oil | 170.76 |
| Methyl n-amyl ketone | 63.88 |
| Bentone 38 gel toluene[a] | 33.68 |
| Cab-O-Sil M5 silica pyrogenic[b] | 2.83 |
| Titanium dioxide DUP-R-960 | 494.47 |
| Methyl n-amyl ketone | 10.39 |
| Methyl n-amyl ketone | 145.98 |
| Methyl n-amyl ketone | 27.62 |
| Tinuvin 292[c] | 7.59 |
| BYK - 310[d] | 3.98 |
| COMPONENT 2 | |
| Desmodur XP-5159[e] | 232.94 |

[a]Gelling and pigment suspending agent commercially available from National Lead Company.
[b]Thickening and emulsifying agent commercially available from Cabot Corporation.
[c]di[4(2,2,6,6-tetramethyl piperdinyl)]sebacate light stabilizer commercially available from Ciba-Geigy.
[d]Flow control agent commercially available from Byk-Malinkrodt.
[e]Polyurethane prepolymer containing 72.50% solids by weight commercially available from Mobay Chemical Company.

Component 1 of the urethane coating was prepared by first adding 170.76 parts by weight of blown castor oil, 63.88 parts by weight of methyl n-amyl ketone, 33.68 parts by weight of Bentone 38 gel toluene, 2.83 parts by weight of CAB-O-SIL M5 silica pyrogenic and 494.47 parts by weight of titanium dioxide into a reaction vessel and mixing at a high speed to obtain a smooth consistency. This mixture was then added to a tank containing 145.98 parts by weight of methyl n-amyl ketone and 194.04 parts by weight of the hydroxy-functional polymer of Example 1. Into this mixture was added 27.62 parts by weight of methyl n-amyl ketone, 7.59 parts by weight TINUVIN 292 light stabilizer, and 3.98 parts by weight BYK-310 flow control agent.

The amount of polyisocyanate added to Component 1 of Example 2 to form the urethane coating was 232.94 parts by weight, which is a volumetric ratio of component 1 to component 2 of 4:1. Urethane coatings according to the present invention were also prepared in volumetric ratios ranging from about 1:1 to 13:1 of component 1 to component 2.

While the invention has been shown and described with respect to a particular embodiment thereof, this is for the purpose of illustration rather than limitation, and other variations and modifications of the specific embodiment herein shown and described will be apparent to those skilled in the art and are within the intended spirit and scope of the invention.

What is claimed is:

1. An acrylic polymer composition formed from the copolymerization of monomers comprising vinyl toluene, a monomer selected from lauryl methacrylate and stearyl methacrylate, and a hydroxy functional monomer selected from hydroxypropyl methacrylate and hydroxypropyl acrylate; wherein said acrylic polymer composition is compatible with castor oil.

2. The composition of claim 1 wherein said hydroxy functional monomer comprises hydroxypropyl methacrylate.

3. The composition of claim 1 wherein said castor oil comprises blown castor oil.

4. An acrylic polymer composition formed from the copolymerization of monomers comprising:
   30-50% by weight vinyl toluene;
   5-10% by weight lauryl methacrylate; and
   30-50% by weight of a hydroxy functional monomer selected from hydroxypropyl methacrylate and hydroxypropyl acrylate;
   wherein said acrylic polymer composition is compatible with castor oil.

5. The composition of claim 4 wherein said hydroxy functional monomer comprises hydroxypropyl methacrylate.

6. The composition of claim 4 wherein said castor oil comprises blown castor oil.

7. A curable composition comprising:
   a. an acrylic polymer formed from the copolymerization of monomers comprising vinyl toluene, a monomer selected from lauryl methacrylate and stearyl methacrylate, and a hydroxy functional monomer selected from hydroxypropyl methacrylate and hydroxypropyl acrylate; wherein said acrylic polymer is compatible with castor oil; and
   b. at least one polyisocyanate.

8. The composition of claim 7 wherein said hydroxy functional monomer comprises hydroxypropyl methacrylate.

9. The composition of claim 7 wherein said castor oil comprises blown castor oil.

10. The composition of claim 7 wherein the polyisocyanate is present at a level to provide about 0.6 to about 1.4 equivalents of isocyanate for equivalent of active hydrogen from the hydroxyl groups of the acrylic polymer.

11. A curable composition comprising:
   a. an acrylic polymer comprising 30–50% by weight vinyl toluene, 5–10% by weight lauryl methacrylate, and 30–50% by weight of a hydroxy functional monomer selected from hydroxypropyl methacrylate and hydroxypropyl acrylate, wherein said acrylic polymer composition is compatible with castor oil; and
   b. at least one polyisocyanate.

12. The composition of claim 11 wherein said hydroxy functional monomer comprises hydroxypropyl methacrylate.

13. The composition of claim 11 wherein said castor oil comprises blown castor oil.

14. The composition of claim 11 wherein the polyisocyanate is present at a level to provide about 0.6 to about 1.4 equivalents of isocyanate for equivalent of active hydrogen from the hydroxyl groups of the acrylic polymer.

15. A curable composition comprising:
   a. an acrylic polymer formed from the copolymerization of monomers comprising vinyl toluene, a monomer selected from lauryl methacrylate and stearyl methacrylate, and a hydroxy functional monomer selected from hydroxypropyl methacrylate and hydroxypropyl acrylate; wherein said acrylic polymer is compatible with castor oil;
   b. castor oil; and
   c. at least one polyisocyanate.

16. The composition of claim 15 wherein said hydroxy functional monomer comprises hydroxypropyl methacrylate.

17. The composition of claim 15 wherein said castor oil comprises blown castor oil.

18. The composition of claim 15 wherein the polyisocyanate is present at a level to provide about 0.6 to about 1.4 equivalents of isocyanate for equivalent of active hydrogen from the hydroxyl groups of the acrylic polymer.

19. A curable composition comprising:
   a. an acrylic polymer formed from the copolymerization of monomers comprising 30–50% by weight vinyl toluene, 5–10% by weight lauryl methacrylate, and 30–50% by weight of a hydroxy functional monomer selected from hydroxypropyl methacrylate and hydroxypropyl acrylate, wherein said acrylic polymer composition is compatible with castor oil;
   b. castor oil; and
   c. at least one polyisocyanate.

20. The composition of claim 19 wherein said hydroxy functional monomer comprises hydroxypropyl methacrylate.

21. The composition of claim 19 wherein said castor oil comprises blown castor oil.

22. The composition of claim 19 wherein the polyisocyanate is present at a level to provide about 0.6 to about 1.4 equivalents of isocyanate for equivalent of active hydrogen from the hydroxyl groups of the acrylic polymer.

* * * * *